(12) United States Patent
Lin

(10) Patent No.: US 9,172,792 B2
(45) Date of Patent: Oct. 27, 2015

(54) METHOD AND ELECTRONIC DEVICE FOR WIRELESS COMMUNICATION

(71) Applicant: HTC Corporation, Taoyuan County (TW)

(72) Inventor: Yi-Cheng Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 194 days.

(21) Appl. No.: 13/916,607

(22) Filed: Jun. 13, 2013

(65) Prior Publication Data

US 2014/0370864 A1   Dec. 18, 2014

(51) Int. Cl.
```
H04M 1/00      (2006.01)
H04M 3/20      (2006.01)
H04M 3/42      (2006.01)
H04W 68/00     (2009.01)
H04M 1/60      (2006.01)
```

(52) U.S. Cl.
CPC .............. H04M 3/20 (2013.01); H04M 1/6066 (2013.01); H04M 3/42042 (2013.01); H04W 68/005 (2013.01)

(58) Field of Classification Search
CPC ....... H04W 24/00; H04W 84/18; H04W 4/12; H03C 1/62; H04B 2001/0491; H04M 1/72519; H04M 1/6066; H04M 19/04; H04M 11/062; H04L 29/08108; H04L 29/06027; G06F 1/1626

USPC ............ 455/415, 413, 556.2, 67.7, 116, 118, 455/41.3, 41.2, 564, 565, 412.2, 414.1, 455/569.1, 567, 575.2; 370/493, 352; 379/88.01, 88.03, 88.12, 88.16, 126, 379/209.01, 210.02, 211.01, 350

See application file for complete search history.

(56) References Cited

U.S. PATENT DOCUMENTS

| | | | |
|---|---|---|---|
| 8,060,069 B1 * | 11/2011 | Lai et al. | 455/415 |
| 2003/0100295 A1 * | 5/2003 | Sakai et al. | 455/415 |
| 2005/0181826 A1 * | 8/2005 | Yueh | 455/556.2 |
| 2007/0286395 A1 * | 12/2007 | Mandalia et al. | 379/350 |
| 2008/0144782 A1 * | 6/2008 | Chou | 379/88.01 |
| 2009/0061769 A1 * | 3/2009 | Zimbric et al. | 455/41.2 |
| 2012/0040617 A1 * | 2/2012 | Hsia et al. | 455/41.3 |

* cited by examiner

*Primary Examiner* — Charles Appiah
*Assistant Examiner* — Alexander Yi
(74) *Attorney, Agent, or Firm* — Jianq Chyun IP Office

(57) ABSTRACT

A method and an electronic device for wireless communication are provided. The method is executed by a first electronic device and includes the following steps: sending a notification of an incoming phone call to a second electronic device, receiving a response to the notification from the second electronic device, and starting the incoming phone call and transmitting a conversation of the incoming phone call between the first electronic device and a wireless headset when the response indicates the incoming phone call is accepted.

18 Claims, 4 Drawing Sheets

US 9,172,792 B2

METHOD AND ELECTRONIC DEVICE FOR WIRELESS COMMUNICATION

BACKGROUND OF THE INVENTION

1. Field of the Invention

The present invention relates to a method and an electronic device for wireless communication. More particularly, the present invention relates to a method and an electronic device capable of forming a loop for wireless communication.

2. Description of the Related Art

In recent years, consumer electronic devices are getting more and more diverse. For example, a consumer can find mobile phones, mobile music players, personal digital assistants and tablet computers on the shelves of various shops.

Bluetooth is a convenient technology that enables the consumer electronic devices to communicate with one another. For example, a Bluetooth mobile phone can transmit the conversation of a phone call to a Bluetooth headset wirelessly. Similarly, a Bluetooth music player can transmit the music to a Bluetooth headset wirelessly. Many such applications can be derived from the Bluetooth technology.

SUMMARY OF THE INVENTION

Accordingly, the present invention is directed to a method and an electronic device capable of forming a loop for wireless communication. Multiple electronic devices in the loop can communicate with one another for synergy and improving user experience.

According to an embodiment of the present invention, a method for wireless communication is provided. The method is executed by a first electronic device and includes the following steps: sending a notification of an incoming phone call to a second electronic device, receiving a response to the notification from the second electronic device, and starting the incoming phone call and transmitting a conversation of the incoming phone call between the first electronic device and a wireless headset when the response indicates the incoming phone call is accepted.

According to another embodiment of the present invention, a method for wireless communication is provided. The method is executed by a first electronic device and includes the following steps: sending music to a wireless headset, receiving a notification of an incoming phone call from a second electronic device, and stop sending the music to the wireless headset after receiving the notification.

According to another embodiment of the present invention, a first electronic device for wireless communication is provided. The first electronic device includes a wireless modem, a wireless transceiver, and a processor coupled to the wireless modem and the wireless transceiver. The wireless modem receives an incoming phone call. The processor generates a notification of the incoming phone call. The wireless transceiver sends the notification to a second electronic device and receives a response to the notification from the second electronic device. The processor starts the incoming phone call when the response indicates the incoming phone call is accepted. The wireless transceiver transmits a conversation of the incoming phone call between the wireless modem and a wireless headset after the processor starts the incoming phone call.

According to another embodiment of the present invention, a first electronic device for wireless communication is provided. The first electronic device includes a wireless transceiver and a processor coupled to the wireless transceiver. The processor provides music. The wireless transceiver sends the music to a wireless headset and receives a notification of an incoming phone call from a second electronic device. The processor stops the wireless transceiver sending the music to the wireless headset after receiving the notification.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
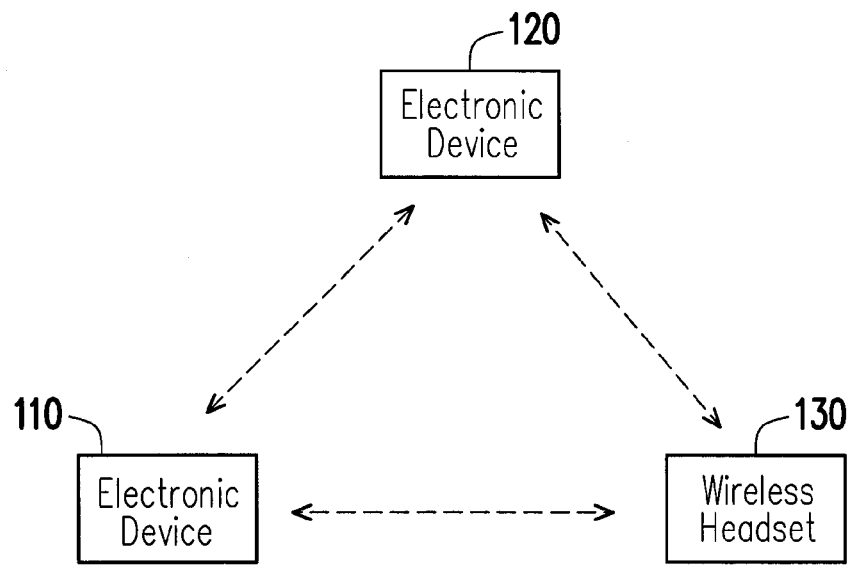
FIG. 1 is a schematic diagram showing a loop for wireless communication according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram showing a loop 100 for wireless communication according to an embodiment of the present invention. The loop 100 includes two electronic devices 110 and 120 and a wireless headset 130. Both the electronic devices 110 and 120 have form factors suitable to be carried or worn by a user. Each of the electronic devices 110 and 120 may be a mobile phone, a mobile music player, a personal digital assistant or a tablet computer.

In the loop 100, the electronic devices 110 and 120 and the wireless headset 130 may communicate with one another by a wireless communication protocol such as Bluetooth. For example, the electronic device 110 may be a mobile phone and the electronic device 120 may be a mobile music player. The electronic devices 110 and 120 and the wireless headset 130 may be carried or worn by the same user. The electronic device 120 may transmit the music to the wireless headset 130. In addition, the electronic device 120 may serve as a user interface or a control panel to control the electronic device 110 to accept incoming phone calls or dial for outgoing phone calls.

When a phone call is connected, the electronic device 110 may transmit the conversation to the wireless headset 130. The electronic devices 110 and 120 may connect via the Serial Port Profile (SPP) of Bluetooth, the electronic device 110 may connect with the wireless headset 130 via the Headset Profile (HSP) of Bluetooth, and the electronic device 120 may connect with the wireless headset 130 via the Advanced Audio Distribution Profile (A2DP) of Bluetooth.

Figure 2:
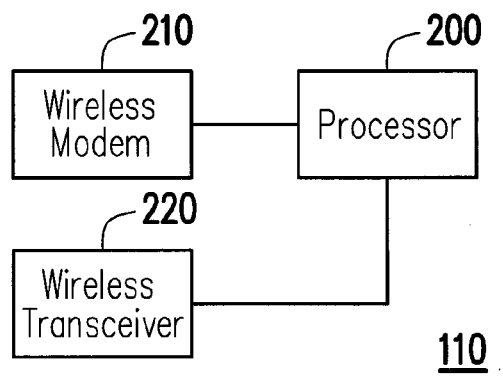
FIG. 2 is a schematic diagram showing an electronic device for wireless communication according to an embodiment of the present invention.

FIG. 2 is a schematic diagram showing the electronic device 110 for wireless communication according to an embodiment of the present invention. In this embodiment, the electronic device 110 is a mobile phone that includes a wireless modem 210, a wireless transceiver 220, and a processor 200 coupled to the wireless modem 210 and the wireless transceiver 220. The wireless modem 210 receives incoming phone calls and dials for outgoing phone calls. The wireless transceiver 220 sends messages to the electronic device 120 and the wireless headset 130 and receives messages from the electronic device 120 and the wireless headset 130 via a wireless communication protocol such as Bluetooth so that the electronic device 110 can communicate with the electronic device 120 and the wireless headset 130. The processor 200 controls the operations of the electronic device 110.

Figure 3:
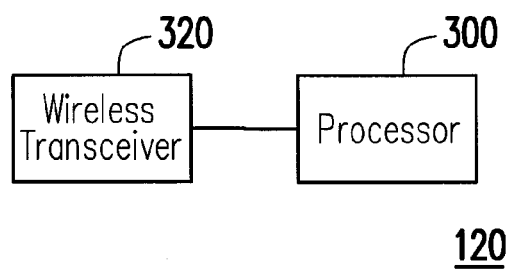
FIG. 3 is a schematic diagram showing another electronic device for wireless communication according to an embodiment of the present invention.

FIG. 3 is a schematic diagram showing the electronic device 120 for wireless communication according to an embodiment of the present invention. In this embodiment, the electronic device 120 is a mobile music player that includes a wireless transceiver 320 and a processor 300 coupled to the wireless transceiver 320. The wireless transceiver 320 sends messages to the electronic device 110 and the wireless headset 130 and receives messages from the electronic device 110 and the wireless headset 130 via a wireless communication protocol such as Bluetooth so that the electronic device 120 can communicate with the electronic device 110 and the wireless headset 130. The processor 300 controls the operations of the electronic device 120.

Figure 4:
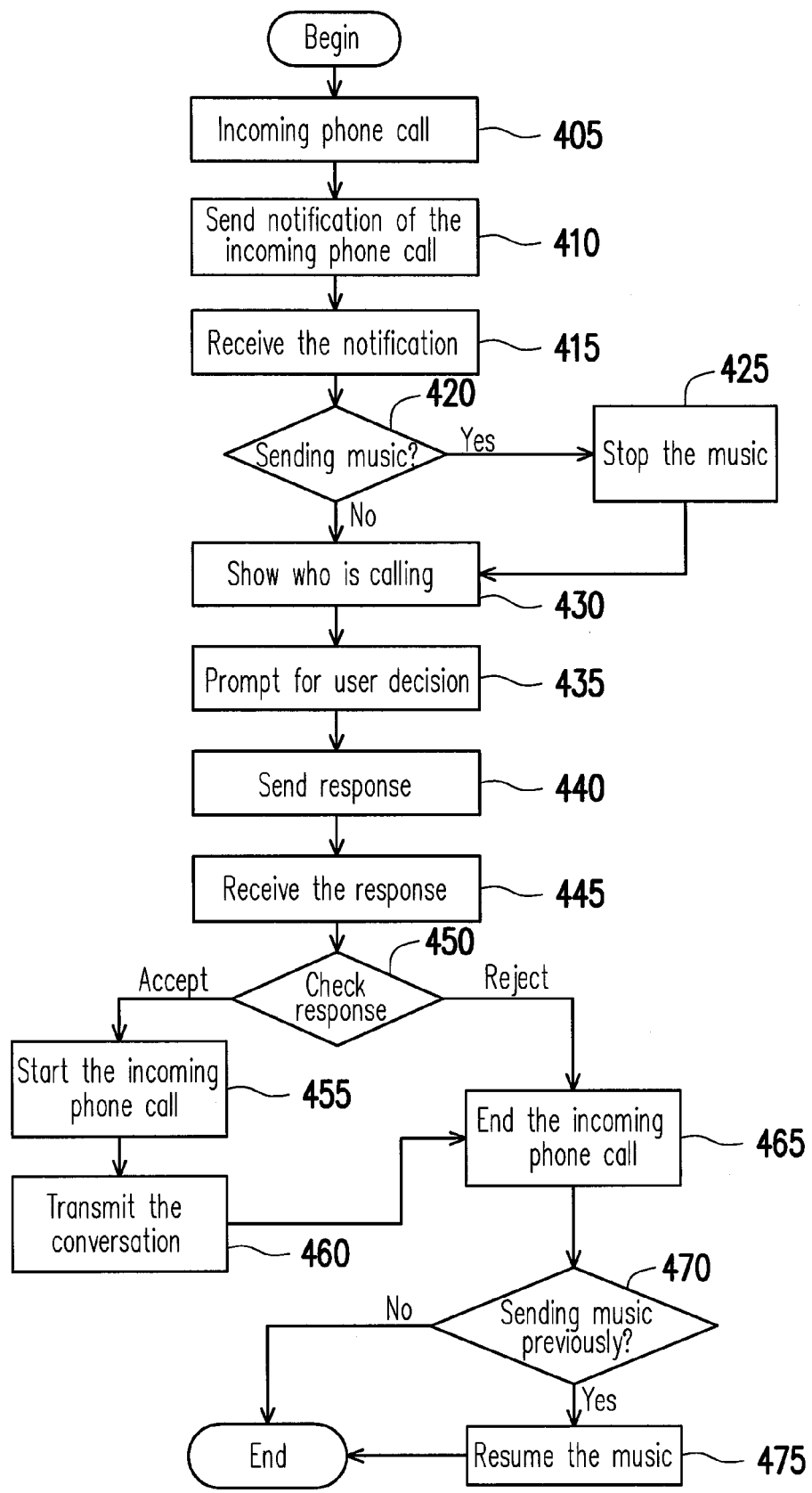
FIG. 4 is a flow chart showing a method for wireless communication according to an embodiment of the present invention.

FIG. 4 is a flow chart showing a method for wireless communication according to an embodiment of the present invention. The method shown in FIG. 4 may be executed by the electronic devices 110 and 120. In step 405, the wireless modem 210 of the electronic device 110 receives an incoming phone call. In step 410, the processor 200 generates a notification of the incoming phone call and the wireless transceiver 220 sends the notification to the electronic device 120. The notification may include an identification code or a picture of the caller of the incoming phone call. For example, the identification code may be a phone number of the caller.

In step 415, the wireless transceiver 320 of the electronic device 120 receives the notification from the electronic device 110. In step 420, the processor 300 checks whether the processor 300 is sending music to the wireless headset 130 or not. For example, before the flow shown in FIG. 4 is executed, the processor 300 may provide music and the wireless transceiver 320 may send the music to the wireless headset 130. When the processor 300 is sending music in step 420, the processor 300 stops the wireless transceiver 320 sending the music to the wireless headset 130 in step 425.

Next, in step 430, the processor 300 shows the identification code or the picture of the caller to the user so that the user knows who is calling. For example, the electronic device 120 may include a display (not shown) and the processor 300 may show the identification code or the picture of the caller on the display. Alternatively, the electronic device 120 may include a speaker (not shown) and the processor 300 may play a notification sound or a ring tone associating with the caller via the speaker.

In step 435, the processor 300 prompts the user to decide whether to accept or reject the incoming phone call. In step 440, the wireless transceiver 320 sends a response to the notification indicating the decision of the user to the electronic device 110. In step 445, the wireless transceiver 220 of the electronic device 110 receives the response to the notification from the electronic device 120. In step 450, the processor 200 checks the response to determine whether the incoming phone call is accepted or rejected by the user.

When the response indicates that the user accepts the incoming phone call, the flow proceeds to step 455 wherein the processor 200 starts the incoming phone call, and then in step 460 the wireless transceiver 220 transmits the conversation of the incoming phone call between the wireless modem 210 and the wireless headset 130 so that the user can talk via the wireless headset 130 instead of talking via the electronic device 120. When the user finishes the conversation, the processor 200 ends the incoming phone call in step 465. Next, in step 470 the processor 300 checks whether or not the processor 300 was sending music to the wireless headset 130 before receiving the notification from the electronic device 110. When the processor 300 was sending music, the processor 300 resumes sending the music to the wireless headset 130 in step 475. On the other hand, when the response checked in step 450 indicates that the user rejects the incoming phone call, the flow proceeds directly to step 465 to end the incoming phone call. The following steps 470 and 475 are already explained above.

Figure 5:
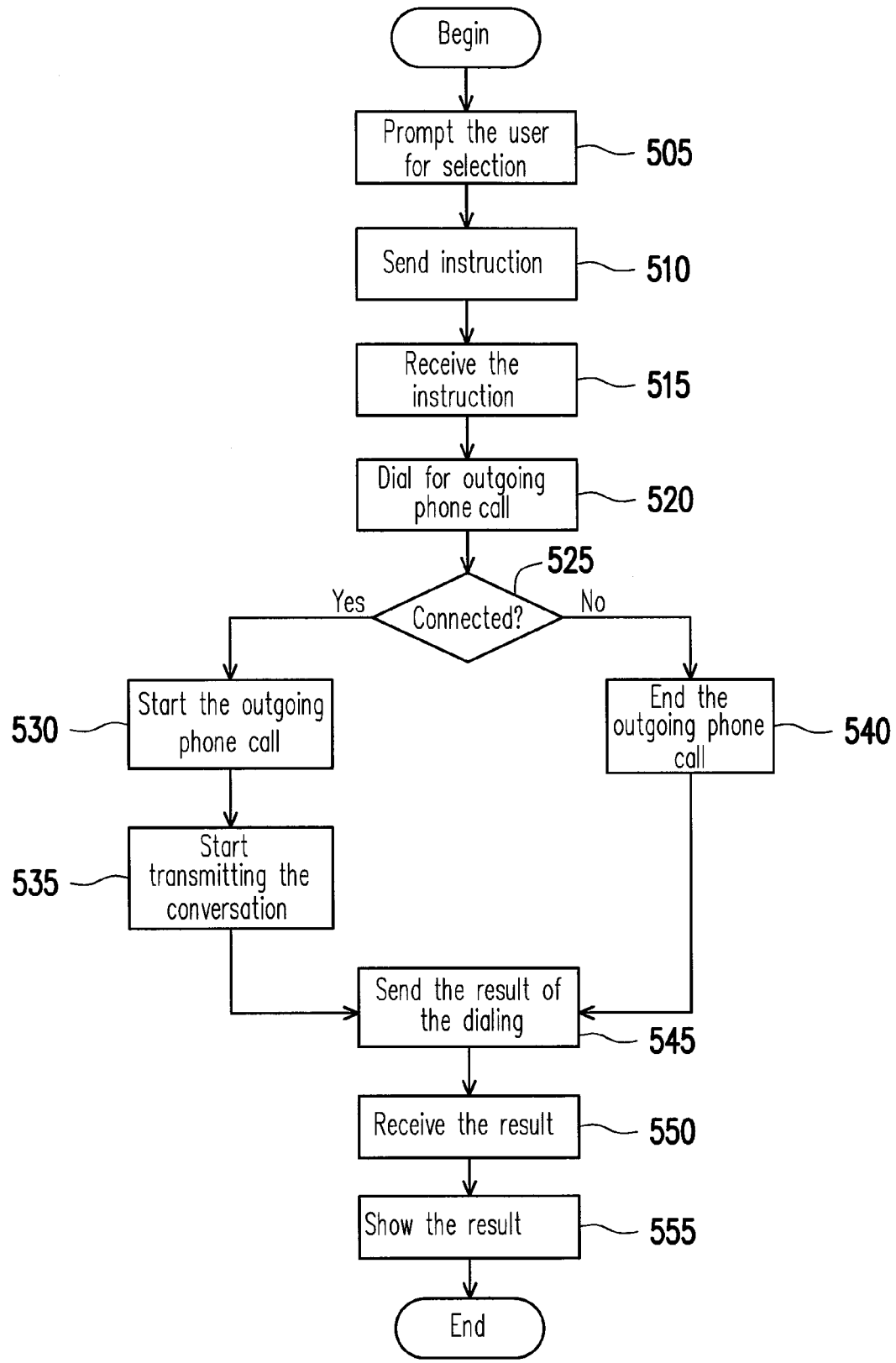
FIG. 5 is a flow chart showing another method for wireless communication according to another embodiment of the present invention.

FIG. 5 is a flow chart showing another method for wireless communication according to another embodiment of the present invention. The method shown in FIG. 5 may be executed by the electronic devices 110 and 120. When the user wants to make a phone call, in step 505 the processor 300 may show the identification codes and/or the pictures of the friends of the user and prompt the user to select the identification code or the picture of one of his/her friends. Since the picture of a friend corresponds to the identification code of the same friend, the processor 300 can obtain the identification code of the friend when the user finishes the selection. In step 510, the wireless transceiver 320 sends an instruction including the selected identification code to the electronic device 110 to control the electronic device 110 to dial for an outgoing phone call according to the selected identification code.

In step 515, the wireless transceiver 220 of the electronic device 110 receives the instruction from the electronic device 120. In step 520, the processor 200 sends the identification code in the instruction from the wireless transceiver 220 to the wireless modem 210, and the wireless modem 210 dials for an outgoing phone call according to the identification code. For example, the identification code may be a telephone number or corresponds to the telephone number and the wireless modem 210 may dial for an outgoing phone call to the telephone number.

In step 525, the processor 200 checks whether the outgoing phone call is connected or disconnected. When the outgoing phone call is connected, the flow proceeds to step 530 wherein the processor 200 starts the outgoing phone call, and then in step 535 the wireless transceiver 220 starts transmitting the conversation of the outgoing phone call between the wireless modem 210 and the wireless headset 130 so that the user can talk via the wireless headset 130 instead of talking via the electronic device 120. On the other hand, when the outgoing phone call is disconnected, the flow proceeds to step 540 wherein the processor 200 ends the outgoing phone call.

Next, in step 545, the processor 200 sends the result of the dialing indicating whether the outgoing phone call is connected or disconnected from the wireless modem 210 to the wireless transceiver 220 and the wireless transceiver 220 sends the result to the electronic device 120. In step 550, the wireless transceiver 320 of the electronic device 120 receives the result from the electronic device 110. In step 555, the processor 300 shows the result to the user. As mentioned above, the processor 300 may show the result via a display or a speaker.

For executing the methods shown in FIG. 4 and FIG. 5, the electronic devices 110 and 120 and the wireless headset 130 may establish connections with one another. The processor 200 may establish the first connection through the wireless transceiver 220 to the electronic device 120 for sending the notification shown in FIG. 4, receiving the response shown in FIG. 4, receiving the instruction shown in FIG. 5, and sending the result shown in FIG. 5. Besides, the processor 200 may establish the second connection through the wireless transceiver 220 to the wireless headset 130 for transmitting the conversation shown in FIG. 4 and FIG. 5. According to Bluetooth standard, the processor 200 must assume a master role for one of the first and the second connections and assumes a slave role for the other one of the first and the second connections. This may be achieved by the role switch procedure of the Link Manager Protocol (LMP) of Bluetooth.

Similarly, the processor 300 of the electronic device 120 may establish the first connection through the wireless transceiver 320 to the wireless headset 130 for sending the music shown in FIG. 5. Besides, the processor 300 may establish the second connection through the wireless transceiver 320 to the electronic device 110 for receiving the notification shown in FIG. 4, sending the response shown in FIG. 4, sending the instruction shown in FIG. 5, and receiving the result shown in FIG. 5. According to Bluetooth standard, the processor 300 must assume a master role for one of the first and the second connections and assumes a slave role for the other one of the first and the second connections. This may be achieved by the role switch procedure of the Link Manager Protocol (LMP) of Bluetooth.

Figure 6:
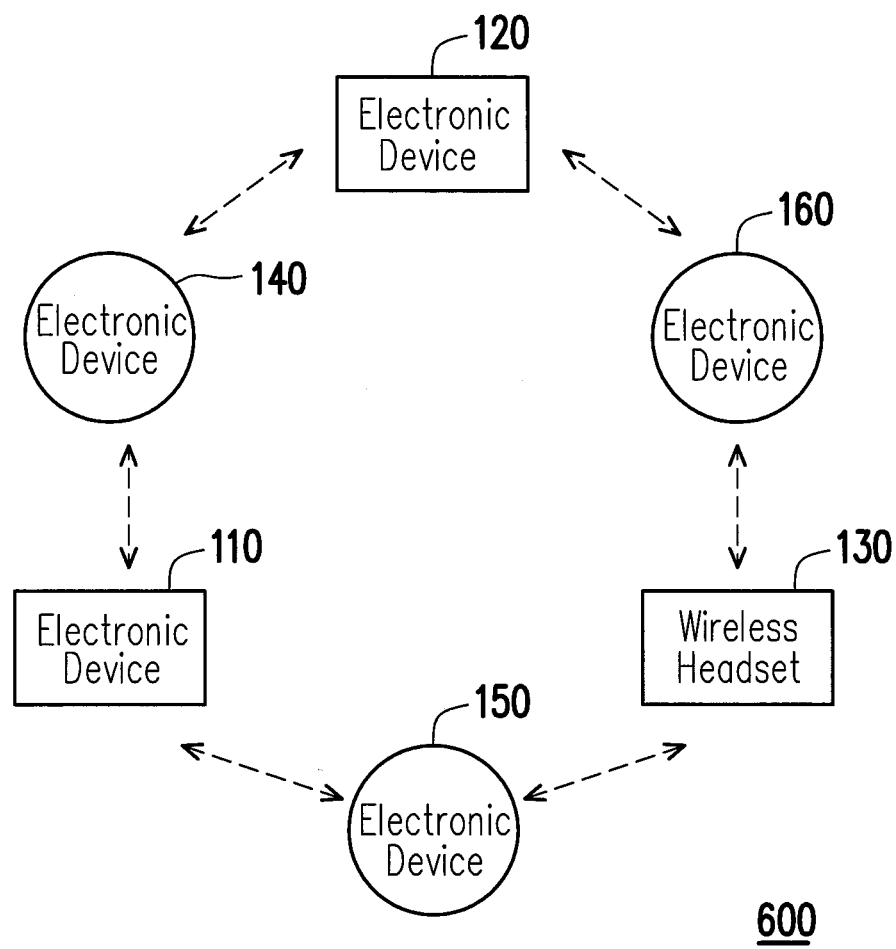
FIG. 6 is a schematic diagram showing a loop for wireless communication according to another embodiment of the present invention.

The aforementioned loop may include more electronic devices. For example, FIG. 6 is a schematic diagram showing a loop 600 for wireless communication according to another embodiment of the present invention. The loop 600 includes five electronic devices 110, 120, 140, 150, 160 and a wireless headset 130. The electronic devices 110, 120, 140, 150, 160 and the wireless headset 130 may communicate with one another by a wireless communication protocol such as Bluetooth. Moreover, in the loop 600 an electronic device may forward messages for other electronic devices.

For example, the electronic devices 110 and 120 and the wireless headset 130 may still execute the methods shown in FIG. 4 and FIG. 5. However, in this embodiment the electronic devices 110 and 120 and the wireless headset 130 do not send messages directly to one another. Instead, the messages are forwarded by the electronic devices 140, 150 and 160. The electronic device 140 may forward the notifications, responses, instructions, and results of the instructions between the electronic devices 110 and 120. The electronic device 150 may forward the audio messages transmitting the conversation between the electronic device 110 and the wireless headset 130. The electronic device 160 may forward the audio messages transmitting the music between the electronic device 120 and the wireless headset 130.

In summary, the present invention is directed to a method and an electronic device capable of forming a loop for wireless communication. Multiple electronic devices in the loop can communicate with one another for synergy and improving user experience. For example, a mobile music player can serve as a control panel or a user interface of a mobile phone such that the user may use the mobile music player to show notifications of incoming phone calls, accept or reject the incoming phone calls, or dial for outgoing phone calls. A wireless headset may be used to play music from the mobile music player and be used to play the conversation of incoming phone calls and outgoing phone calls.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for wireless communication, executed by a first mobile electronic device and a second mobile electronic device, comprising: sending, by the second mobile electronic device, a music to a wireless headset via Advanced Audio Distribution Profile (A2DP) of Bluetooth; sending, by the first mobile electronic device, a notification of an incoming mobile phone call to the second mobile electronic device; stop, by the second mobile electronic device, sending the music to the wireless headset; receiving, by the first mobile electronic device, a response to the notification from the second mobile electronic device; starting, by the first mobile electronic device, the incoming mobile phone call and directly transmitting a conversation of the incoming mobile phone call between the first mobile electronic device and the wireless headset when the response indicates the incoming mobile phone call is accepted; and resuming, by the second mobile electronic device, sending the music to the wireless headset when the incoming mobile phone call ends; wherein sending, by the first mobile electronic device, a result of dialing for an outgoing mobile phone call on a request from the second mobile electronic device, indicating whether the outgoing mobile phone call is connected or disconnected to the second mobile electronic device, for showing the result to a user, and starting, by the first mobile electronic device, the outgoing mobile phone call and transmitting, by the first mobile electronic device, a conversation of the outgoing mobile phone call between the first mobile electronic device and the wireless headset when the outgoing mobile phone call is connected.

2. The method of claim 1, wherein the notification comprises an identification code or a picture of a caller of the incoming phone call.

3. The method of claim 1, further comprising:
ending, by the first electronic device, the incoming phone call when the response indicates the incoming phone call is rejected.

4. The method of claim 1, further comprising:
receiving, by the first electronic device, an instruction comprising an identification code from the second electronic device; and
dialing, by the first electronic device, for an outgoing phone call according to the identification code.

5. The method of claim 1, further comprising:
establishing, by the first electronic device, a first connection to the second electronic device for sending the notification and receiving the response;
establishing, by the first electronic device, a second connection to the wireless headset for transmitting the conversation;
assuming, by the first electronic device, a master role for one of the first and the second connections; and
assuming, by the first electronic device, a slave role for the other one of the first and the second connections.

6. The method of claim 1, wherein the notification comprises an identification code or a picture of a caller of the incoming phone call, and the method further comprising:
showing, by the second electronic device, the identification code or the picture to a user;
prompting, by the second electronic device, the user to decide whether to accept or reject the incoming phone call; and sending, by the second electronic device, a response indicating the decision of the user to the first electronic device.

7. The method of claim 1, further comprising:
prompting, by the second electronic device, a user to select an identification code or a picture corresponding to the identification code; and
sending, by the second electronic device, an instruction comprising the identification code to the first electronic device to control the first electronic device to dial for an outgoing phone call according to the identification code.

8. The method of claim 7, further comprising:
receiving, by the second electronic device, a result of the dialing indicating whether the outgoing phone call is connected or disconnected from the first electronic device; and
showing, by the second electronic device, the result to the user.

9. The method of claim 1, further comprising:
establishing, by the second electronic device, a first connection to the wireless headset for sending the music;
establishing, by the second electronic device, a second connection to the first electronic device for receiving the notification;
assuming, by the second electronic device, a master role for one of the first and the second connections; and
assuming, by the second electronic device, a slave role for the other one of the first and the second connections.

10. A system for wireless communication, comprising: a first mobile electronic device, comprising: a wireless modem; a first wireless transceiver; and a first processor coupled to the wireless modem and the first wireless transceiver, wherein the wireless modem receives an incoming mobile phone call, the first processor generates a notification of the incoming mobile phone call, the first wireless transceiver sends the notification to a second mobile electronic device and receives a response to the notification from the second mobile electronic device, the first processor starts the incoming mobile phone call when the response indicates the incoming mobile phone call is accepted, and the first wireless transceiver directly transmits a conversation of the incoming mobile phone call between the wireless modem and a wireless headset after the first processor starts the incoming mobile phone call; and the second electronic device, comprising: a second wireless transceiver; and a second processor coupled to the second wireless transceiver, wherein the second processor provides a music, the second wireless transceiver sends the music to the wireless headset via Advanced Audio Distribution Profile (A2DP) of Bluetooth and receives the notification of an incoming mobile phone call from the first electronic device, and the second processor stops the second wireless transceiver sending the music to the wireless headset after receiving the notification, and resumes sending the music to the wireless headset when the incoming mobile phone call ends; wherein the first processor sends a result of the dialing by the first wireless transceiver for an outgoing mobile phone call on a request from the second mobile electronic device, indicating whether the outgoing mobile phone call is connected or disconnected, and the first wireless transceiver sends the result to the second mobile electronic device, for showing the result to a user, and the first processor starts the outgoing mobile phone call when the outgoing mobile phone call is connected, and the first wireless transceiver transmits a conversation of the outgoing mobile phone call between the wireless modem and the wireless headset after the first processor starts the outgoing mobile phone call.

11. The system of claim 10, wherein the notification comprises an identification code or a picture of a caller of the incoming phone call.

12. The system of claim 10, wherein the first processor ends the incoming phone call when the response indicates the incoming phone call is rejected.

13. The system of claim 10, wherein the first wireless transceiver receives an instruction comprising an identification code from the second electronic device, the first processor sends the identification code from the first wireless transceiver to the wireless modem, and the wireless modem dials for an outgoing phone call according to the identification code.

14. The system of claim 10, wherein the first processor establishes a first connection through the first wireless transceiver to the second electronic device for sending the notification and receiving the response, establishes a second connection through the first wireless transceiver to the wireless headset for transmitting the conversation, assumes a master role for one of the first and the second connections, and assumes a slave role for the other one of the first and the second connections.

15. The system of claim 10, wherein the notification comprises an identification code or a picture of a caller of the incoming phone call, the second processor shows the identification code or the picture to a user and prompts the user to decide whether to accept or reject the incoming phone call, and the second wireless transceiver sends a response indicating the decision of the user to first electronic device.

16. The system of claim 10, wherein the second processor prompts a user to select an identification code or a picture corresponding to the identification code, and the second wireless transceiver sends an instruction comprising the identification code to the first electronic device to control the first electronic device to dial for an outgoing phone call according to the identification code.

17. The system of claim 16, wherein the second wireless transceiver receives a result of the dialing indicating whether the outgoing phone call is connected or disconnected from the first electronic device, and the second processor shows the result to the user.

18. The system of claim 10, wherein the second processor establishes a first connection through the second wireless transceiver to the wireless headset for sending the music, establishes a second connection through the second wireless transceiver to the first electronic device for receiving the notification, assumes a master role for one of the first and the second connections, and assumes a slave role for the other one of the first and the second connections.

* * * * *